Nov. 16, 1965   O. J. NYGREN   3,217,442
AUTOMATIC CASTING RODS
Filed June 24, 1963
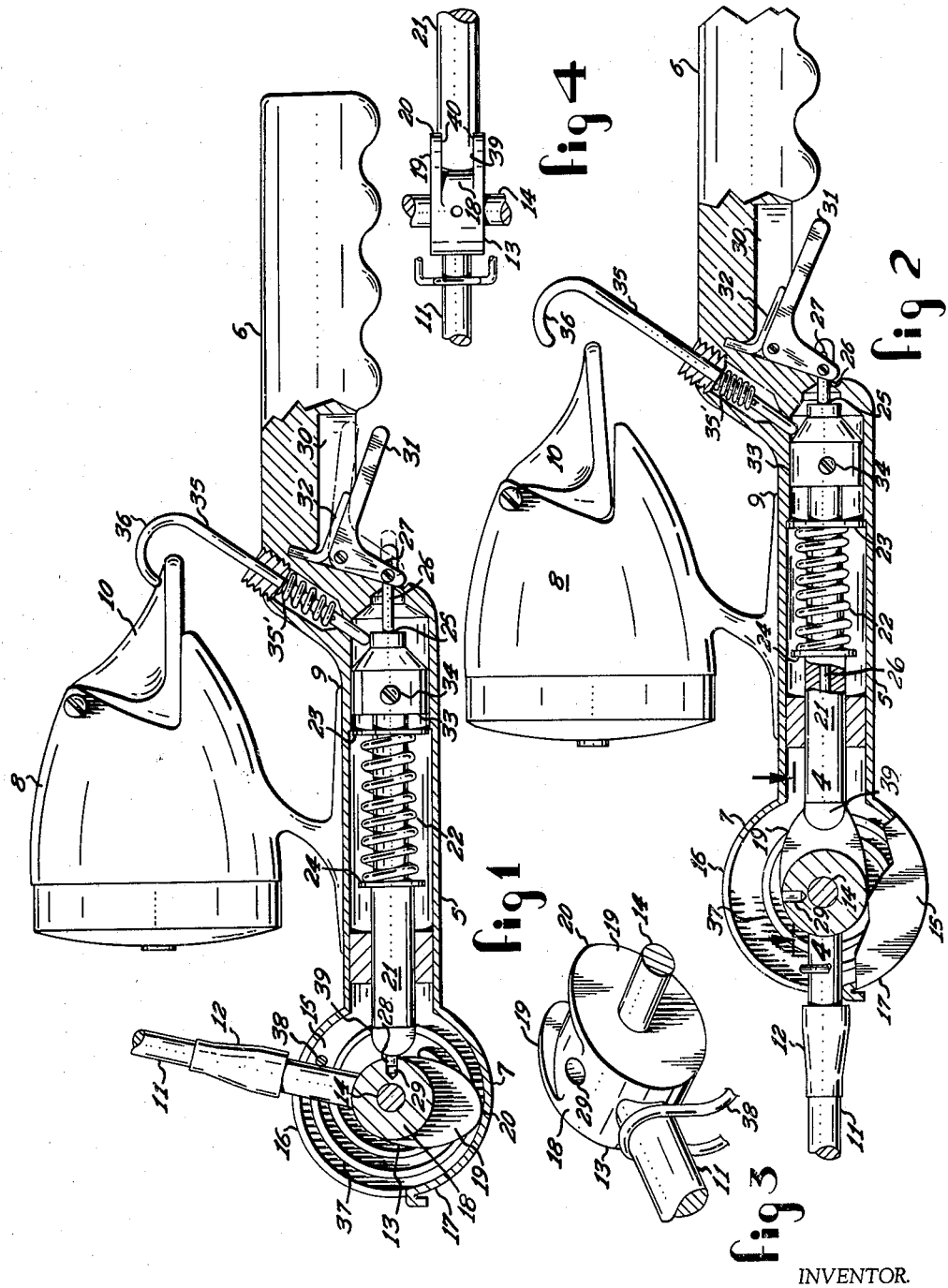
INVENTOR.
OTTO J. NYGREN
BY *David K. Kilgore*
ATTORNEY United States Patent Office 3,217,442
Patented Nov. 16, 1965

3,217,442
AUTOMATIC CASTING RODS
Otto J. Nygren, 6036 13th Ave. S., Minneapolis, Minn.
Filed June 24, 1963, Ser. No. 290,131
2 Claims. (Cl. 43—19)

This invention relates broadly to fishing tackle; more particularly to a combined fishing rod and reel; and specifically to an automatic casting rod capable of casting a fishing line with terminal tackle attached without wrist or arm movements.

The principal object of this invention is to provide an automatic casting rod for angling that will cast a fishing line having terminal tackle attached thereto by the simple expedient of finger movement of the angler to actuate trigger means.

A further object of this invention is to provide an automatic casting rod that will permit the use of a conventional spin cast reel without alteration of said wheel.

A still further object of this invention is to provide an automatic casting reel wherein the rod tip is interchangeable.

These and other objects of the invention will become apparent from the following specification and claims when taken in conjunction with the appended drawing which forms a part of this application, and in which drawing, like characters indicate like parts throughout the several views.

To the above end, generally stated, the invention consists of the following devices and combination of devices hereinafter described and defined in the claims.

Referring to the drawing:

FIG. 1 is a side elevational view in section, some parts being broken away, showing the invention adjusted for casting a fishing line, and further diagrammatically illustrating a conventional push-button spin cast type fishing reel mounted on the automatic casting rod.

FIG. 2 is a view similar to FIG. 1 except that the rod is adjusted for retrieving a fishing line, and a portion of the main cam rod is broken away to show slidable mounting of the latch bar therein.

FIG. 3 is a perspective view on an enlarged scale of a cam element also fragmentarily showing the mount for the rod tip, and FIG. 4 is a top plan view of the cam element on an enlarged scale and also fragmentarily showing a portion of the operating mechanism and the rod tip mount taken on the line 4—4 of FIG. 2.

The numeral 5 is directed broadly to a tubular housing affording a mounting station for certain of the working elements of the automatic casting rod, said housing having a grip section 6 formed integral with the outer end portion thereof, and a spring housing 7 formed integral with the inner end portion of said tubular housing 5.

A conventional push-button spin cast type reel 8 is provided for the storage of a quantity of fishing line, not shown, said reel being removably mounted in a reel seat 9 formed in the upper surface of the tubular housing 5. The conventional thumb lever 10 of reels of this type is operated in the subject invention by automatic means thus permitting the use of standard reels of the type described without alteration of said reel as will presently be explained more in detail.

The rod tip 11 which may be interchangeable for different kinds of angling procedures is preferably of one piece construction and the slide section 12 at the butt end portion of said rod tip 11 normally engaging a ferrule, not shown, is rigidly and centrally mounted in the main body portion of a cam element 13. This cam 13 is provided with a pair of opposed outwardly projecting transversely disposed studs 14 that are journaled in the respective side plates 15 of the spring housing 7. The rod tip 11 mounted on the cam 13 projects outwardly of the spring housing 7 via a radially disposed slot 16 formed in the transverse cover portion 17 of the said spring housing 7. It is important to understand at this point that the cam 13 is of the heart type having a central cylindrical body portion 18 and a pair of transversely spaced lobes 19, the forward surfaces of said lobes also affording cam acting surfaces 20 as will presently appear more in detail.

A cam actuated rod 21 is mounted for endwise reciprocating movements within the tubular housing 5 and is projected into engagement with the lobes 19 of the cam 13 by the loading of a coiled spring 22 working against washer like bases of resistance 23 and 24 respectively. This cam actuated rod 21 is provided with a longitudinally disposed axial bore 25 in which is mounted, a secondary cam rod 26, being mounted in said bore 25 for endwise reciprocating longitudinal movements.

The inner end portion of this secondary cam rod 26 is provided with a longitudinally disposed slotted head 27 and the outer end portion 28 thereof projects outwardly of the cam rod 21 for engagement with a bore 29 in the cam surface 18 for a purpose that will also presently appear.

The secondary cam rod 26, at its slotted head 21 is pivotally secured to a trigger member 31 that is pivotally mounted on the underside of the grip section 6 adjacent the trigger finger of an angler holding the fishing rod. The trigger member 31 is normally held uncocked by the loading of a leg spring 32 seated in the said grip section 6 and bearing against the trigger member 31 with constant tension. It will thus be seen that by trigger manipulation, the secondary cam rod 26 is moved with reciprocating endwise movements to engage or disengage the protruding outer end portion 28 of said secondary cam rod 26 with the bore 29 in the cam surface 18.

It is important to note that in the interest of properly positioning the trigger member 31 relative to its associated elements it is necessary to provide a recess 30 in the grip section 6 into which the said trigger moves when manipulated to activate the associated elements of the invention.

Mounted within the tubular housing 5, adjacent its connection with the grip section 6 is a crown cam 33 that is adjustably mounted on the inner end portion of the cam actuated rod 21 by means of a set screw 34 that has screw threaded engagement with the body of the crown cam 33 and when tightened, impinges the cam rod 21 to lock said crown cam in a predetermined position.

Cooperating with the crown cam 33 is a still further cam actuated rod 35 that is mounted diagonally in the forward end portion of the grip section 6. This cam rod 35 is spring loaded by means of a coiled spring 35' that encircles the same and imposes downward loading on said cam rod. The said cam rod extends outwardly of the upper surfaces of the said grip section and terminates in an upstanding forwardly bent hook 36 that is constructed, arranged, and dimensioned to engage the thumb lever 10 of a standard push-button type spin cast reel 8. It will be understood that the said hook 36 is bent to accommodate the reel shown but that in actual manufacturing practice, this member will have to be altered to adjust to different reels, however, it is thought that the hook 36 is quite universal in its adaptations.

The inner end portion of the cam rod 35 engages the crown cam 33 whereby said rod and its hook 36 is moved into and out of engagement with the thumb lever 10 of the reel 8. It will be understood that this thumb lever 10 must be depressed to lock the line, not shown, in position while the rod tip 11 is moved rearwardly and thence smartly forward to cast said line. Pressure on the thumb lever is released to permit the said line and its terminal tackle to be cast from the reel 8, via the rod tip 11. Subsequent description explaining the use of the subject invention will clarify the function of the control of the thumb lever 10 and its relationship with the cam rod 35.

As has been stated, the object of this invention is to impart casting action to the rod tip 11 without the usual wrist or arm action by the angler and to impart this movement, a heavy flat spiral spring 37 is mounted in the spring housing 7. One end portion of said flat spiral spring 37 is secured in one of the side plates 15 of the said spring housing 7. This spiral spring encircles one of the studs 14 mounting the cam 13 and then under tension is hooked over the butt end portion of the rod tip 11, see numeral 38.

To cock the rod tip 11 for casting the angler holds the grip section 6 firmly with one hand and with the other hand, grasps the rod tip 11 as closely as possible to the butt end portion thereof. Then, against the tension of the flat spiral spring 37 the said rod tip is pivoted rearwardly about the axis of the studs 14.

To fully understand the pivotal cocking action of the rod tip 11 it is important to note here that the slot 16 formed in the circumferential surface of the transverse portion 17 of the spring housing 7 is so positioned in said surface so as to afford stop means for the pivotally mounted rod tip 11. When the said rod tip in its travel through the slot 16 reaches the forward limit of said slot, it will engage the transverse cover member 17 thereby terminating further pivotal movement of said rod tip 11. At this point the said rod tip is in longitudinal alignment with the tubular housing 5 and is parallel to the grip section 6 for normal angling procedure.

When the said rod tip is substantially 90 degrees to its aligned position with respect to the tubular housing 5 the outer end portion 28 of the secondary cam rod 26 is projected into the bore 29 in the cylindrical cam surface 18 by means of the spring loading of the trigger member 31 thus locking the rod tip 11 in cocked position.

With the rod thus cocked with said rod tip 11 substantially at 90 degrees to the grip section 6 and the tubular housing 5 it is only necessary to press the trigger member 31 thus withdrawing the outer end portion 28 of the cam rod 26 from the bore 29 in the cam surface 18. The action of the heavy spiral spring 37 under tension will cause the rod tip 11 to snap forward thereby casting the fishing line, and its terminal tackle, not shown, from the rod tip.

The said line and tackle is then retrieved via the reel 8 in a conventional manner and the rod tip again cocked for each subsequent cast. It will be understood that practice will dictate how the automatic casting rod must be aimed to project the tackle to the desired target.

It is highly important to note at this point that the forward end portion of the cam actuated rod 21 is machined to afford two flat opposed surfaces 39 having shoulders 40 that afford surfaces on which the cam surfaces 20 of the lobes 19 act. The said forward end portion of the cam actuated rod is arranged to travel between the said lobes 19 of the cam 13 with a close working fit, also, further affording guide means for the cam actuated rod 21, see FIG. 4.

When the rod tip 11 is cocked as shown in FIG. 1, the cam surfaces 20 of the lobes 19 of the cam 13 are out of engagement with the shoulders 40 on the cam actuated rod 21. In this position the spring loaded cam rod 35 and the mounted crown cam 33 are positioned to permit the hook 36 on the cam rod 35 to engage the thumb lever 10 of the reel 8. In this position the reel 8 is locked and the line cannot be drawn therefrom thus permitting the assembled rod and reel to be, handled, manipulated, and aimed at a target with the fishing line and terminal tackle under control.

The timing of the cooperating cam surfaces 20 on the cam lobes 19 and the crown type cam 33 is such that as the cam 13 is activated by pressing the trigger member 31, the cam surfaces 20 on the lobes 19 of the cam 13 acting on the shoulders 40 of the cam actuated rod 21 will cause the cam rod 35 to be moved upwardly by its engagement with the cam surfaces of the crown cam 33. By this movement of the cam rod 35 the integral hook 38 of the said cam rod 35 is released from its engagement with the thumb lever 10 of the reel 8 to thus permit the fishing line on the reel 8 to be stripped from the spool of said reel and the terminal tackle cast to the target area.

After a simple casting procedure it will be obvious that the line and tackle will be retrieved to the desired position relative to the outer guide, not shown, of the tip section of 11 and the said tip section again cocked for an ensuing cast.

The function of the push-button type spin cast reel is such that as the reel handle, not shown, is cranked to retrieve the fishing line the thumb lever 10 is automatically retrieved to locked position to prevent the inadvertent "stripping off" of the fishing line from the spool of said reel and by virtue of the loading of the coiled spring 22 and the loading of the coiled spring 35', the cam rod 35 and its hook 36 are retrieved to engagement with said thumb lever 10 as the rod tip 11 is cocked and conversely released when the trigger member is pressed.

It will be understood that the function of the hook 36 is to replace the thumb of the angler in normal manipulation of the reel 8, however, in view of the automatic action of the rod tip 11 it is highly important to time the movement of the said rod tip 11 with the proper manipulation of the reel 8 in order to release the fishing line from the reel 8 at the exact moment when the forward travel of the rod tip has reached the position whereby it will produce the greatest possible distance to a given cast.

While there are herein disclosed but a limited number of embodiments of the structure, process and product of the invention herein presented, it is possible to produce still other embodiments without departing from the inventive concept herein disclosed, and it is desired, therefore, that only such limitations be imposed upon the appended claims as are stated herein, or required by the prior art.

What I claim is:

1. An automatic casting rod for use with a push button actuated spin cast fishing reel comprising in combination,
    a grip section,
    an elongated tubular housing secured to said grip section in substantially offset parallel relation thereto,
    a spring housing secured with the forward end of said tubular housing, said spring housing having side members and a transversely disposed cover portion extending between said side members,
    said cover portion having a longitudinally disposed slot formed therein,
    a primary cam having a body and cam means extending outwardly therefrom,
    said cam being pivotally mounted in the side members of said housing for rotation about its transverse axis,
    a rod section rigidly secured at its inner end portion to the body portion of said primary cam and extending substantially radially from the body of said cam and through said slot in said cover portion,
    a spiral spring under tension mounted in said spring housing, one end of said spring being connected to a lower end portion of said rod section disposed within said spring housing, the other end of said spring being connected to said spring housing for biasing said rod section from a cocked position in which said rod section is disposed about perpendicular to the tubular housing to a release position in which said rod section is disposed in substantial alignment with said tubular housing, a spring-loaded cam rod reciprocably mounted in said tubular housing, said primary cam having latch-receiving means thereon, a latch bar slidably mounted in said cam rod and having one end portion adapted to engage said latch-receiving means for holding said rod section in said cocked position, a trigger member shiftably connected to said grip section and having a portion thereof connected to the other end of said latch whereby shifting movement of said trigger member in one direction will move said latch-end portion of said latch bar from engagement with said latch-receiving means on said cam to release said rod section from its cocked position, said spring loaded cam rod having abutment means at one end portion thereof for cooperation with the cam means of said primary cam when said rod section is moving between said cocked and released position, a shiftable shank mounted adjacent the forward end of said grip member having an overhanging outer end shaped and adapted to engage the line control means of a push button spin cast reel and having an inner end operatively associated with the end portion of said cam rod (opposite from the end having said abutment means) to control shifting of said shank, whereby upon release of said rod section from its cocked position, by said latch bar, said cam means extending from said primary cam will engage the abutment of said cam rod to release said overlying portion of said shank from engagement with the line control means of the push button spin cast reel.

2. An automatic casting rod for use with a push button actuated spin cast fishing reel comprising in combination, a grip section, an elongated, tubular housing secured to said grip section in substantially offset parallel relation thereto, a spring housing integral with the forward end of said tubular housing, said spring housing having side plates and a transversely disposed cover portion extending between said side plates, said cover portion having a longitudinally disposed slot formed therein, a primary cam having a main body portion and a pair of laterally spaced lobes extending outwardly therefrom, said lobes having edge portions providing cam surfaces, said primary cam being pivotally mounted in said spring housing for rotation about its transverse axis, a rod tip section rigidly secured at its inner end portion to the main body portion of said primary cam, said rod tip section extending through said slot in said cover, a flat spiral spring under tension, mounted in said spring housing, one end of said spring being connected to a lower end portion of said rod tip section disposed within said spring housing, the other end of said spring being connected to said spring housing for biasing said rod tip section from a cocked position in which said rod tip section is disposed substantially perpendicular to the tubular housing to a release position in which said rod tip section is disposed in substantial alignment with said tubular housing, a spring-loaded cam rod reciprocably mounted in said tubular housing, said primary cam having latch means thereon, a latch bar slidably mounted in said cam rod and having one end portion adapted to engage said latch means on said primary cam for holding said rod tip section in said cocked position, a trigger member pivotally connected to said grip section and having a portion thereof connected to the other end of said latch bar whereby pivotal movement of said trigger member in one direction will move said one end portion of said latch bar from engagement with said latch means on said primary cam to release said rod tip section from its cocked position, said spring-loaded cam rod having a shoulder portion at one end thereof for cooperation with said cam surfaces on said lobes when said rod tip section is moving between said cocked and released position, secondary cam means rigidly mounted on the other end of said cam rod, a secondary spring-loaded cam rod diagonally mounted in said grip section relative to the longitudinal axis thereof and extending through a bore in said tubular housing, one end of said secondary cam rod being in engagement with said secondary cam and the other end thereof being hook shaped and adapted to engage the line control means of a push button spin cast fishing reel, whereby upon release of said rod tip section from its cocked position by said latch bar said cam surfaces of said lobes will rotate and contact said shoulder portion of said spring-loaded cam rod to move said secondary cam and secondary spring-loaded cam rod to release said hook shaped portion thereof from engagement with the line control means of the bush button spin cast reel.

References Cited by the Examiner
UNITED STATES PATENTS
2,765,568  10/1956  Kozar _____ 43—19

FOREIGN PATENTS
827,107  2/1960  Great Britain.

ABRAHAM G. STONE, *Primary Examiner.*